(12) United States Patent
Vidyadhara et al.

(10) Patent No.: US 12,061,911 B2
(45) Date of Patent: Aug. 13, 2024

(54) SYSTEMS AND METHODS FOR RESOURCE ISOLATION FOR NETWORK BOOT USING VIRTUAL MACHINE MONITOR

(71) Applicant: Dell Products L.P., Round Rock, TX (US)

(72) Inventors: Sumanth Vidyadhara, Bangalore (IN); Shubham Kumar, Chakradharpur (IN)

(73) Assignee: Dell Products L.P., Round Rock, TX (US)

( * ) Notice: Subject to any disclaimer, the term of this patent is extended or adjusted under 35 U.S.C. 154(b) by 333 days.

(21) Appl. No.: 17/192,026

(22) Filed: Mar. 4, 2021

(65) Prior Publication Data
US 2022/0283821 A1    Sep. 8, 2022

(51) Int. Cl.
*G06F 9/4401*   (2018.01)
*G06F 9/455*    (2018.01)

(52) U.S. Cl.
CPC ........ *G06F 9/4416* (2013.01); *G06F 9/45533* (2013.01); *G06F 9/45558* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 6,732,249 B1 * | 5/2004 | Pickreign | G06F 12/1081 711/170 |
| 8,156,298 B1 * | 4/2012 | Stubblefield | G06F 21/6281 711/163 |
| 2014/0282815 A1 * | 9/2014 | Cockrell | H04L 67/125 726/1 |
| 2018/0075238 A1 * | 3/2018 | Ferrie | G06F 21/566 |

* cited by examiner

*Primary Examiner* — Paul Yen
(74) *Attorney, Agent, or Firm* — Jackson Walker L.L.P.

(57) ABSTRACT

An information handling system may include a processor and a basic input/output system configured to be the first code executed by the processor when the information handling system is booted and configured to initialize components of the information handling system into a known state, the basic input/output system further configured to implement a virtual machine monitor, the virtual machine monitor configured to isolate resources of the information handling system allocated to a network boot process of the information handling system from other resources of the information handling system allocated to other components of the basic input/output system.

15 Claims, 2 Drawing Sheets

SYSTEMS AND METHODS FOR RESOURCE ISOLATION FOR NETWORK BOOT USING VIRTUAL MACHINE MONITOR

TECHNICAL FIELD

The present disclosure relates in general to information handling systems, and more particularly to methods and systems for resource isolation for network boot using a virtual machine monitor.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Network boot, including boot over Hypertext Transfer Protocol (HTTP), is a well-known feature used in many information handling systems. However, existing approaches to network boot may impose potential security concerns. For example, a download and storage of a boot image and loading of preboot images may lead to some security vulnerability.

A System Management Mode (SMM) may also provide (e.g., through an SMM communication protocol) runtime services for communication between drivers outside of SMM and a registered system management interrupt inside of SMM. For example, basic input/output system (BIOS) preboot drivers, runtime drivers, or operating system agents may consume such communication protocol. Due to the prevalence of potential attacks via an SMM communication buffer, a number of approaches have been used to protect the communication buffer. For example, one such approach is to ensure the SMM communication buffer resides in an expected fixed memory region.

However, this protection of the SMM communication buffer can lead to other issues. For example, it is possible that an SMM communication buffer may be allocated from a reserved range in a driver execution environment (DXE) phase of operation before HTTP boot is started. In such a scenario, it may be possible that HTTP boot is unable to allocate memory for downloading the boot image due to lack of sufficient memory or lack of sufficient contiguous blocks of memory. In addition, there may be various other BIOS components mapped to reserved memory for various reasons, which may also cause lack of sufficient contiguous blocks of memory.

SUMMARY

In accordance with the teachings of the present disclosure, the disadvantages and problems associated with existing approaches to network boot of an information handling system may be reduced or eliminated.

In accordance with embodiments of the present disclosure, an information handling system may include a processor and a basic input/output system configured to be the first code executed by the processor when the information handling system is booted and configured to initialize components of the information handling system into a known state, the basic input/output system further configured to implement a virtual machine monitor, the virtual machine monitor configured to isolate resources of the information handling system allocated to a network boot process of the information handling system from other resources of the information handling system allocated to other components of the basic input/output system.

In accordance with these and other embodiments of the present disclosure, a method may include, in a basic input/output system configured to be the first code executed by a processor when an information handling system is booted and configured to initialize components of the information handling system into a known state, implementing a virtual machine monitor, the virtual machine monitor configured to isolate resources of the information handling system allocated to a network boot process of the information handling system from other resources of the information handling system allocated to other components of the basic input/output system.

In accordance with these and other embodiments of the present disclosure, an article of manufacture may include a non-transitory computer-readable medium and computer-executable instructions carried on the computer-readable medium, the instructions readable by a processing device, the instructions, when read and executed, for causing the processing device to, in a basic input/output system configured to identify, test, and/or initialize information handling resources of an information handling system: in a basic input/output system configured to be the first code executed by a processor when an information handling system is booted and configured to initialize components of the information handling system into a known state, implement a virtual machine monitor, the virtual machine monitor configured to isolate resources of the information handling system allocated to a network boot process of the information handling system from other resources of the information handling system allocated to other components of the basic input/output system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring

DETAILED DESCRIPTION

Figure 1:
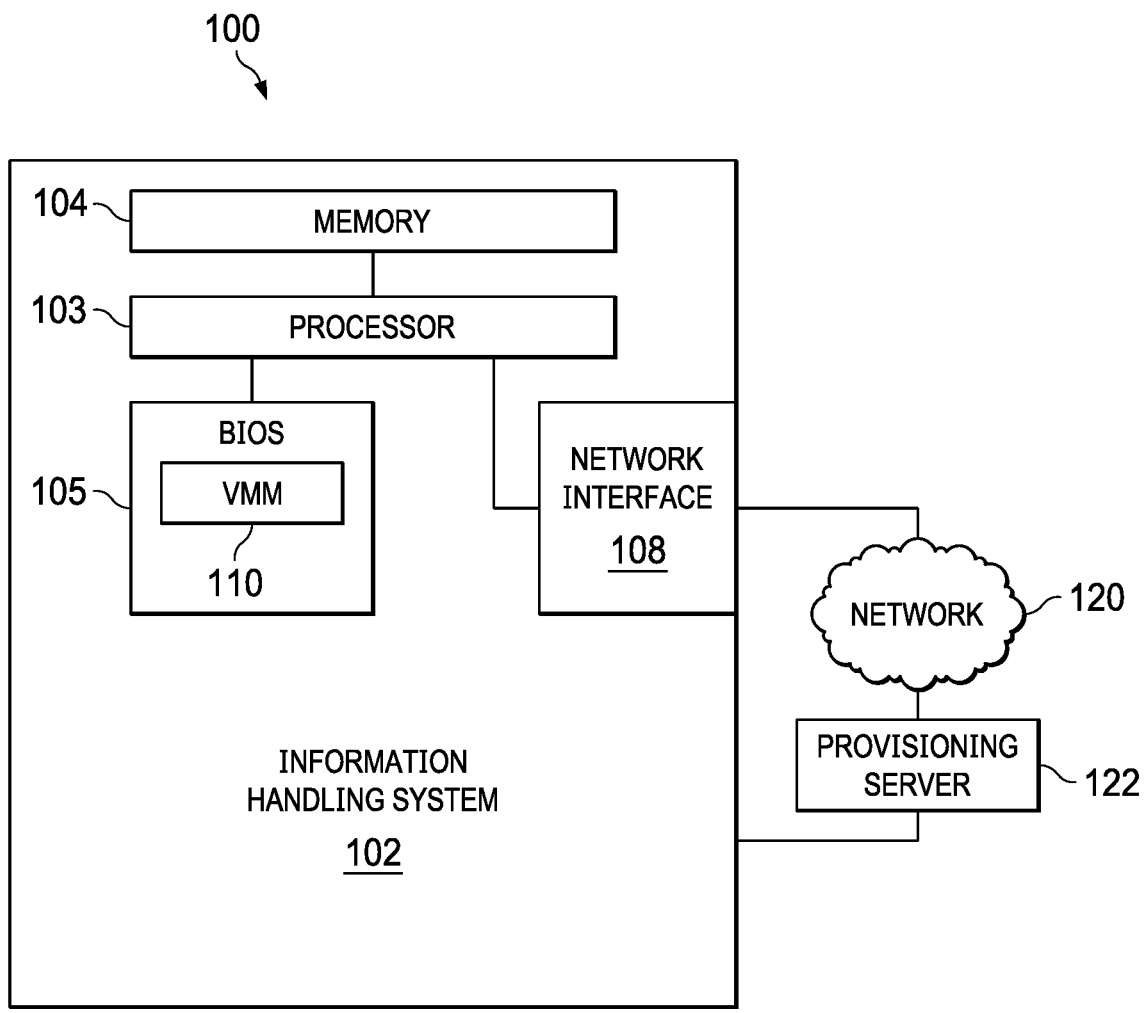
FIG. 1 illustrates a block diagram of an example system for resource isolation for network boot using a virtual machine monitor, in accordance with embodiments of the present disclosure.
Figure 2:
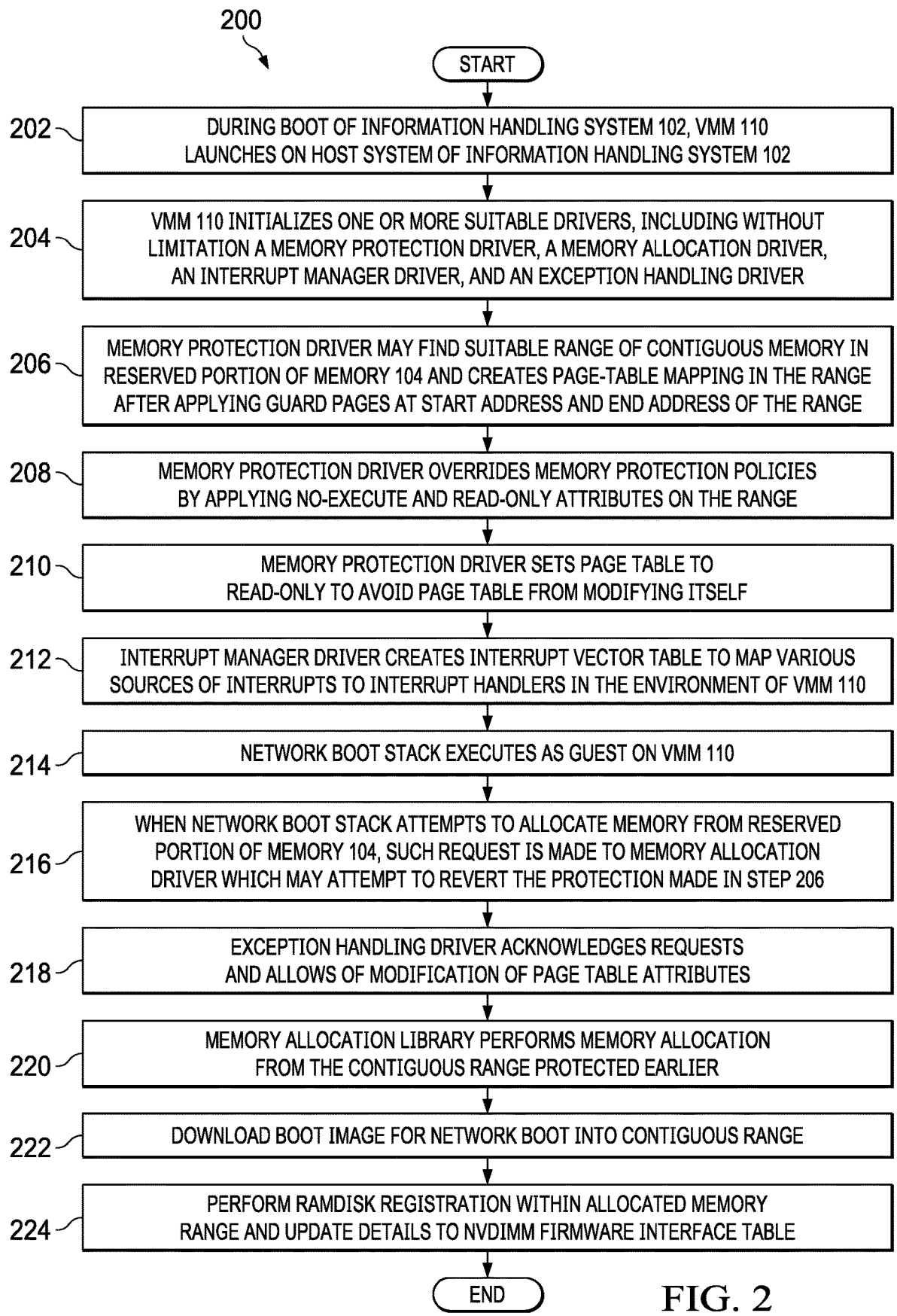
FIG. 2 illustrates a block diagram of an example method for resource isolation for network boot using a virtual machine monitor, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example system for resource isolation for network boot using a virtual machine monitor, in accordance with embodiments of the present disclosure. As shown in FIG. 1, system 100 may include an information handling system 102, a network 120, and a provisioning server 122.

In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a basic input/output (BIOS) system 105 communicatively coupled to processor 103, and a network interface 108 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

As shown in FIG. 1, BIOS 105 may include a virtual machine monitor (VMM) 110. VMM 110, which may also be known as a "hypervisor," may comprise software (i.e., executable code or instructions) and/or firmware generally operable to allow multiple guest operating systems to run on a single information handling system at the same time. This operability is generally allowed via virtualization, a technique for hiding the physical characteristics of information handling system resources from the way in which other systems, applications, or end users interact with those resources. In one embodiment, VMM 110 may comprise a specially-designed preboot operating system (OS), configured to execute within a chipset of information handling system 102, with native virtualization capabilities. In operation, VMM 110 may launch and execute a network boot application (e.g., an HTTP boot application) from within VMM 110, which may execute on the host system of information handling system 102 to control hardware resources of information handling system 102. Accordingly, SMM events and other preboot services of BIOS 105 may still execute in the context of information handling system 102, but may remain isolated from the environment of VMM 110.

Network interface 108 may comprise any suitable system, apparatus, or device operable to serve as an interface between information handling system 102 and one or more other information handling systems. Network interface 108 may enable information handling system 102 to communicate using any suitable transmission protocol and/or standard. In these and other embodiments, network interface 108 may comprise a network interface card, or "NIC."

In addition to processor 103, memory 104, BIOS 105, and network interface 108, information handling system 102 may include one or more other information handling resources.

Network 120 may comprise a network and/or fabric configured to couple information handling system 102 and provisioning server 122 to each other and/or one or more other information handling systems. In these and other embodiments, network 120 may include a communication infrastructure, which provides physical connections, and a management layer, which organizes the physical connections and information handling systems communicatively coupled to network 120. Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

Provisioning server 122 may comprise an information handling system, and may include any system, device, or apparatus configured to store operating system images and/or application images to be accessed by and downloaded to information handling system 102 during network boot of information handling system 102.

FIG. 2 illustrates a block diagram of an example method 200 for resource isolation for network boot using VMM 110, in accordance with embodiments of the present disclosure. As noted above, teachings of the present disclosure may be implemented in a variety of configurations of information handling system 102. As such, the preferred initialization point for method 200 and the order of the steps comprising method 200 may depend on the implementation chosen.

At step 202, during a boot of information handling system 102, VMM 110 may launch on the host system of information handling system 102. After launch, VMM 110 may have access to various system resources of information handling system 102.

At step 204, VMM 110 may initialize one or more suitable drivers, including without limitation a memory protection driver, a memory allocation driver, an interrupt manager driver, and an exception handling driver.

At step 206, the memory protection driver may find a suitable range (e.g., 2-3 gigabytes) of contiguous memory in a reserved portion of memory 104 and may create a page-table mapping in the range after applying guard pages at a start address and end address of the range At step 208, the memory protection driver may then override memory protection policies by applying no-execute and read-only attributes on the range. At step 210, the memory protection driver may set the page table to read-only to avoid the page table from modifying itself.

At step 212, the interrupt manager driver may create an interrupt vector table to map various sources of interrupts to interrupt handlers in the environment of VMM 110.

At step 214, the network boot stack may execute as a guest on VMM 110. At step 216, when the network boot stack attempts to allocate memory from the reserved portion of memory 104, such request may be made to the memory allocation driver which may attempt to revert the protection made in step 206. At step 218, the exception handling driver may acknowledge this request and allow modification of page table attributes. Accordingly, at step 220, the memory allocation library may perform memory allocation from the contiguous range protected earlier in method 200. As a result, VMM 110 may isolate hardware resources for network boot components to provide its share of allocated memory range.

At step 222, VMM 110 may download a boot image for network boot into the contiguous range. At step 224, VMM 110 may perform Ramdisk registration within this allocated memory range and update details to an NVDIMM Firmware Interface Table.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Further, if an SMM communication buffer or any other BIOS driver running in the host environment requires the reserved portion of memory 104, such resources may be allocated reserved pages from the reserved portion not protected by VMM 110. Any malicious attack or an unintentional buffer overflow or modification of page table attributes may result in a host-level exception and a host-level exception handler may handle the exception as per the mapping established above. Similarly, an unidentified or malicious access to non-VMM memory by any virtual machine guest may result in an exception and the exception handling driver may handle the exception and deny access.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a processor; and
a basic input/output system configured to be the first code executed by the processor when the information handling system is booted and to initialize components of the information handling system into a known state, the basic input/output system further configured to implement a virtual machine monitor, the virtual machine monitor configured to:
launch a memory protection driver configured to:
find a range of contiguous memory in a reserved portion of a memory; and
apply no-execute and read-only attributes to the range of contiguous memory to configure the range of contiguous memory as a protected and contiguous range of reserved memory;
store a network boot process image to the protected and contiguous range of reserved memory to isolate information handling system resources allocated to a network boot process from resources of the information handling system not allocated to the network boot process.

2. The information handling system of claim 1, wherein the information handling system resources allocated to the network boot process include hardware resources of network boot components.

3. The information handling system of claim 2, wherein the virtual machine monitor is further configured to generate an exception if a process other than the network boot process attempts to access the contiguous range of reserved memory.

4. The information handling system of claim 3, wherein the virtual machine monitor is further configured to handle the exception to prevent the process other than the network boot process from accessing the contiguous range of reserved memory.

5. The information handling system of claim 1, wherein the network boot process comprises a Hypertext Transfer Protocol boot process.

6. A method comprising, in a basic input/output system configured to be the first code executed by a processor when an information handling system is booted and to initialize components of the information handling system into a known state, implementing a virtual machine monitor, the virtual machine monitor configured to:
launch a memory protection driver configured to:
find a range of contiguous memory in a reserved portion of a memory; and
apply no-execute and read-only attributes to the range of contiguous memory to configure the range of contiguous memory as a protected and contiguous range of reserved memory;
store a network boot process image to the protected and contiguous range of reserved memory to isolate information handling system resources allocated to a network boot process from resources of the information handling system not allocated to the network boot process.

7. The method of claim 6, wherein the wherein the information handling system resources allocated to the network boot process include hardware resources of network boot components.

8. The method of claim 7, wherein the virtual machine monitor is further configured to generate an exception if a process other than the network boot process attempts to access the contiguous range of reserved memory.

9. The method of claim 8, wherein the virtual machine monitor is further configured to handle the exception to prevent the process other than the network boot process from accessing the contiguous range of reserved memory.

10. The method of claim 9, wherein the network boot process comprises a Hypertext Transfer Protocol boot process.

11. An article of manufacture comprising:
a non-transitory computer-readable medium; and
computer-executable instructions carried on the computer-readable medium, the instructions readable by a processing device, the instructions, when read and executed, for causing the processing device to, in a basic input/output system configured to identify, test, and/or initialize information handling resources of an information handling system:
in a basic input/output system configured to be the first code executed by a processor when an information handling system is booted and to initialize components of the information handling system into a known state, implement a virtual machine monitor, the virtual machine monitor configured to:
launch a memory protection driver configured to:
  find a range of contiguous memory in a reserved portion of a memory; and
  apply no-execute and read-only attributes to the range of contiguous memory to configure the range of contiguous memory as a protected and contiguous range of reserved memory;
  store a network boot process image to a protected and contiguous range of reserved memory to isolate information handling system resources allocated to a network boot process from other resources of the information handling system not allocated to the network boot process.

12. The article of claim 11, wherein the wherein the information handling system resources allocated to the network boot process include hardware resources of network boot components.

13. The article of claim 12, wherein the virtual machine monitor is further configured to generate an exception if a process other than the network boot process attempts to access the contiguous range of reserved memory.

14. The article of claim 13, wherein the virtual machine monitor is further configured to handle the exception to prevent the process other than the network boot process from accessing the contiguous range of reserved memory.

15. The article of claim 11, wherein the network boot process comprises a Hypertext Transfer Protocol boot process.

* * * * *